US011448006B2

(12) United States Patent
Gaunt

(10) Patent No.: US 11,448,006 B2
(45) Date of Patent: Sep. 20, 2022

(54) FRAME CONNECTOR

(71) Applicant: Aanco (UK) Limited, Billingham (GB)

(72) Inventor: Ashley Gaunt, Billingham (GB)

(73) Assignee: AANCO (UK) LIMITED, Billingham (GB)

( * ) Notice: Subject to any disclaimer, the term of this patent is extended or adjusted under 35 U.S.C. 154(b) by 0 days.

(21) Appl. No.: 17/271,130

(22) PCT Filed: May 20, 2019

(86) PCT No.: PCT/GB2019/051388
§ 371 (c)(1),
(2) Date: Feb. 24, 2021

(87) PCT Pub. No.: WO2020/044008
PCT Pub. Date: Mar. 5, 2020

(65) Prior Publication Data

US 2021/0254399 A1 Aug. 19, 2021

(30) Foreign Application Priority Data

Aug. 29, 2018 (GB) ..................................... 1814022

(51) Int. Cl.
*E06B 3/96* (2006.01)
*E06B 3/972* (2006.01)
(Continued)

(52) U.S. Cl.
CPC ............ *E06B 3/9725* (2013.01); *E06B 3/968* (2013.01); *E06B 3/9645* (2013.01)

(58) Field of Classification Search
CPC .......... E06B 3/96; E06B 3/964; E06B 3/9641; E06B 3/9645; E06B 3/972; E06B 3/9725; E06B 3/968
See application file for complete search history.

(56) References Cited

U.S. PATENT DOCUMENTS 3,822,101 A * 7/1974 Schneider ............. E06B 3/9725 403/295
3,967,910 A * 7/1976 Tollefsrud .............. F16B 12/50 403/402
(Continued)

FOREIGN PATENT DOCUMENTS

CN 207485264 U 6/2018
CN 108868500 A * 11/2018 ............. E06B 3/964
(Continued)

*Primary Examiner* — Ryan D Kwiecinski
(74) *Attorney, Agent, or Firm* — Husch Blackwell LLP

(57) ABSTRACT

A frame connector for securing a first frame member to a second frame member, the frame connector comprising a first body having a first pair of arms extending along first and second axes from a origin mitre plane to respective free ends; a second body adjacent to the first body and having a contact surface and a second pair of arms extending from the origin mitre plane to respective free ends, and an actuator secured to the first body and arranged to apply a force to the contact surface in a first direction. The first and second axes are non-colinear and define a first plane. The first direction forms an acute angle to the first plane. The actuator is arranged to displace the first body relative to the second body in the first direction.

16 Claims, 8 Drawing Sheets

(51) Int. Cl.
*E06B 3/964* (2006.01)
*E06B 3/968* (2006.01)

(56) References Cited

U.S. PATENT DOCUMENTS

| | | | | | |
|---|---|---|---|---|---|
| 4,076,438 | A * | 2/1978 | Bos | E06B 3/982 | 403/402 |
| 5,384,978 | A * | 1/1995 | Peters | A47G 1/102 | 40/785 |
| 5,423,626 | A * | 6/1995 | Peters | E06B 3/982 | 403/309 |
| 6,339,891 | B1 * | 1/2002 | Cox | A47G 1/102 | 403/294 |
| 6,393,676 | B1 * | 5/2002 | Dowzall | G09F 13/0409 | 403/402 |
| 10,421,315 | B2 * | 9/2019 | Roy | B25B 5/00 | |
| 10,619,405 | B2 * | 4/2020 | Leontaridis | E06B 3/06 | |
| 2006/0233600 | A1 * | 10/2006 | Egli | E06B 3/9646 | 403/294 |
| 2007/0297854 | A1 * | 12/2007 | Ohrstrom | E06B 3/9647 | 403/401 |
| 2021/0046615 | A1 * | 2/2021 | Hodgson | F16B 7/0473 | |

FOREIGN PATENT DOCUMENTS

| | | | | |
|---|---|---|---|---|
| CN | 111119691 | A * | 5/2020 | |
| DE | 29717517 | U1 | 3/1999 | |
| DE | 102020113834 | A1 * | 11/2021 | |
| EP | 1892366 | A1 * | 2/2008 | E06B 3/9641 |
| EP | 1892366 | A1 | 2/2008 | |
| NL | 1006720 | C2 | 2/1999 | |
| WO | 9803760 | A1 | 1/1998 | |
| WO | WO-02075093 | A1 * | 9/2002 | E06B 3/9725 |

* cited by examiner

FRAME CONNECTOR

This invention relates to a frame connector for securing a first frame member to a second frame member.

BACKGROUND

Frames formed of multiple sections need to be secured together, in order to be able to securely hold a pane, for example a glazing pane for a window or door, in place. Doors and windows typically have multiple mitre joints which are formed when one section of frame is secured to another section at a right-angle. Prior art connectors are formed of two or more parts and secure the mitre joint by inserting a part of a connector within an inner channel of the respective sections, and sequentially expanding the connector until the required pressure was achieved within each section. The connector is accessed through a hole fabricated, for example by drilling, punching or machining, in the outer surface of each section of frame so that a user can manually expand each part of the connector in a direction perpendicular to a plane of the frame defined by the edges of the frame. This approach is undesirable for a number of reasons.

Firstly, by having to expand the connector sequentially, the pressure exerted on each frame member is often not equal, which can result in the frame being mis-aligned, which manifests as a step forming at the mitre joint line. Further, by only expanding the connector in a direction perpendicular to the plane of the frame, the abutting surfaces of the sections may not be aligned, resulting in mis-alignments at the corners of the frame. Such mis-alignments are unattractive and undesirable. Yet further, by accessing the frame from an outer surface of the frame, the resulting frame will still have a hole present, which may allow egress of glue or sealant used to permanently fix the two frame members together out of the hole, resulting in an unsightly finish, which is undesirable.

Prior art frame mitred connections typically incorporate a thermal break formed of strips of insulating material that space an inner portion of the frame from an outer portion of the frame. A further problem of the prior art is that the fabrication process of the thermal breaks to make up the frame members can happen in such a way that an error in the total width of the frame member is exhibited. This may result in one frame section having a different depth to a second frame sections, resulting in a mis-alignment between one or both surfaces of the first and second frame sections.

The present invention seeks to address at least some of these problems.

BRIEF SUMMARY OF THE DISCLOSURE

Viewed from a first aspect, the present invention provides a frame connector for securing a first frame member to a second frame member, the frame connector comprising a first body having a first pair of arms extending along first and second axes from a mitre plane to respective free ends; a second body adjacent to the first body and having a contact surface and a second pair of arms extending from the mitre plane to respective free ends, and an actuator secured to the first body and arranged to apply a force to the contact surface in a first direction. The first and second axes are non-colinear and define a first plane. The first direction forms an acute angle to the first plane. The actuator is arranged to displace the first body relative to the second body in the first direction.

Thus, the present invention provides a frame connector that is able to robustly and aesthetically secure a first frame member to a second frame member by expanding in multiple directions within an internal channel of the frame members. The frame connector is particularly advantageous, as the mutual expansion within both frame members using a single actuator significantly reduces the risk of forming steps across a mitre joint line. Further, multiple directions of expansion provide a more secure fit within the frame member, which allows for the same frame connector to be used in a wider range of applications.

The first direction may form an acute angle to a plane defined by the normal axis of the first plane and the first axis.

The frame connector may comprise a second actuator secured to the first body and arranged to apply a second force to the contact surface in a second direction. The second direction may form an acute angle with the first plane. The first direction may be different to the second direction, and the second actuator may be arranged to displace the first body relative to the second body in the second direction.

The second direction may be substantially perpendicular to the first direction. The second direction may be substantially perpendicular to a plane defined by the first direction and a normal axis of the first plane.

The actuator may be configured to apply the force to the second body following input from a tool. This is advantageous, as it allows for a user to expand the frame connector to the desired configuration. A further advantage of this approach is the actuator may be made with fewer components.

The actuator may comprise a threaded outer surface and the first body may comprise a hole having a threaded inner surface corresponding to the threaded outer surface to secure a portion of the actuator within the first body. The actuator may be arranged to separate the first body from the second body upon rotation of the tool. Using rotary motion to generate translation of the actuator is particularly advantageous, as it provides greater control to the user when expanding the frame connector by self-locking once rotation ceases. A further advantage, is the user is able to retract the frame connector by an amount if necessary.

The hole may extend through the first body at an angle to the first plane of between 1 and 89 degrees.

The contact surface may intersect the mitre plane. The contact surface may be substantially perpendicular to the first direction.

The frame connector may further comprise a first plurality of members extending from the first body along a series of parallel axes, and a second plurality of members extending from the second body towards the first body. Each of the second plurality of members may comprises a core extending along the series of parallel axes configured to receive a respective member of the first plurality of members. The first plurality of members may be arranged to constrain the displacement of the second plurality of members along the series of parallel axes. The series of parallel axes may be substantially parallel to the first direction. This is advantageous, as the relatively displacement between the first and second bodies can be guided along a desired axis of motion. A further advantage of providing multiple members is a reduced risk of the first body twisting, and possible becoming stuck, as it moves relative to the second body.

The first and second pluralities of members may be arranged symmetrically about the mitre plane.

A first subset of the first plurality of members may be configured to generate an interference fit with a first subset of the second plurality of members. The interference fit may be sufficient to maintain a first distance between the first and second bodies. Alternatively, the first distance may be maintained by a barbed surface on one or more of either of the guide pins or tubular members. In one example, the barbed surface may be disposed on the guide pin, which would enable the guide pin to bite into the inner surface of the tubular member to maintain the first distance.

The first subset of the first plurality of members may be configured to release the second subset of the first plurality of members upon application of the force.

The first subset of the second plurality of members may be adjacent to the mitre plane. This is particularly advantageous, as it reduces the risk of uneven divergence of the first body relative to the second body and further reduces the risk of rotation between the first and second bodies.

Viewed from a further independent aspect, the present invention provides a system comprising a frame connector according to any of the appended claims; a first frame member having a first face, and a first channel configured to receive the first arms of the respective first and second pairs of arms of the frame connector; a second frame member having a second face, a first channel configured to receive the second arms of the respective first and second pairs of arms of the frame connector, and an aperture adjacent the second face. The first face and second face may form a mitre joint plane. The aperture is located over the actuator. Thus, the invention also provides a system where only the necessary frame member components require additional time to machine as the offset aperture provides access for the tool by only requiring one frame member to be machined. By incorporating standard components where possible, a more time- and cost-effective frame assembly can be produced.

The second frame member may comprise a first side wall, and the first aperture may be formed within the first side wall.

The second frame member may comprise a second side wall connected to the first side wall, and the first aperture may be formed within the second side wall.

Viewed from a further independent aspect, the present invention provides a system comprising a frame connector according to any of the appended claims, a first frame member having a first face and a first channel configured to receive the first arms of the respective first and second pairs of arms of the frame connector, and a second frame member having a second face and a first channel configured to receive the second arms of the respective first and second pairs of arms of the frame connector. The frame connector is configured to secure the first frame member relative to the second frame member such that first face and the second face abut to form a mitre joint. This advantageously provides a system, for example in the form of a window frame, a door frame or a skylight framework, that can be assembled using one or more frame connectors and sections of frame that do not have an aperture machined therein to provide access to the actuator. Thus, a system can be assembled without needing to machine a slot or aperture into sections of the frame to accommodate a tool.

The second frame member may comprise a second channel, and first and second insulating members disposed between the first and second channels. The first and second insulating members may comprise a second aperture at the second face, and the second aperture may be arranged to allow relative displacement between the first and second channels. This is advantageous, as it allows for fine-tuning of the frame member due to errors in the fabrication process of the insulating members creating inconsistencies in the width of assembled frame members.

Viewed from a further independent aspect, the present invention provides a method of assembly, comprising providing a frame connector according to the appended claims, inserting the first pair of arms of the frame connector into a first channel of a first frame member, the first frame member having a first face intersecting the first channel of the first frame member, inserting the second pair of arms of the frame connector into a first channel of a second frame member, the second frame member having a second face intersecting the first channel of the second frame member, arranging the first and second frame members such that the first face is spaced from the second face, operating the actuator to secure the first frame member relative to the second frame member, and applying an external force to one of the first or second frame members so as to abut the first face against the second face, thereby forming a mitre joint. This advantageously allows sections of frame that do not have any additional slots machined to provide access for tools to be assembled using the corner key described herein. An installer is thus able to operate the actuator to secure the sections of frame relative to one another before bringing them together to form the mitre joint. The spacing between the first and second faces is preferably kept to a minimum as to reduce the amount of energy and effort required to form the mitre joint. By way of example, the spacing between the first and second face may be 10 mm. However, it would be apparent that a smaller spacing, for example between 5 mm and 10 mm, or a larger spacing, for example between 10 mm and 50 mm may be suitable. In some cases, the spacing may be greater than 50 mm or less than 5 mm.

The method may further comprise inserting a tool between the first face and the second face to operate the actuator. It would be understood that while a manual tool such as an Allen key is described, the actuator may also be operated by non-contact means. A magnetic connection or a wireless connection to an electric motor within the system that is arranged to actuate the first body relative to the second body are examples of such non-contact means.

Viewed from a further independent aspect, the present invention provides a method of assembly, comprising providing a frame connector according to any of the appended claims, inserting the first pair of arms of the frame connector into a first channel of a first frame member, the first frame member having a first face intersecting the first channel of the first frame member, inserting the second pair of arms of the frame connector into a first channel of a second frame member, the second frame member having a second face intersecting the first channel of the second frame member, arranging the first and second frame members such that the first face abuts the second face, and operating the actuator to secure the first frame member relative to the second frame member to form a mitre joint.

All scientific and technical terms used herein have meanings commonly used in the art unless otherwise specified. The definitions provided herein are to facilitate understanding of certain terms used frequently herein.

The terms “central” and “distal” refer to relative positions of elements of the frame connector described in relation to a mitre plane, represented by the plane defined where first and second frame sections join to form a mitre joint. The mitre plane also intersects the first and second pairs of arms where their respective first and second arms intersect. As used herein, “central” or “more central to” is defined as being closer or nearer to the mitre plane, with the mitre plane being central to the distal free ends. “Distal” or “distal to” is defined as being closer or nearer to the free ends of the respective first and second pairs of arms, with the free ends being distal to the mitre plane. The free ends refer to the distal ends of the frame connector.

BRIEF DESCRIPTION OF THE DRAWINGS

Embodiments of the invention are further described hereinafter with reference to the accompanying drawings, in which.

DETAILED DESCRIPTION

Figure 1A:
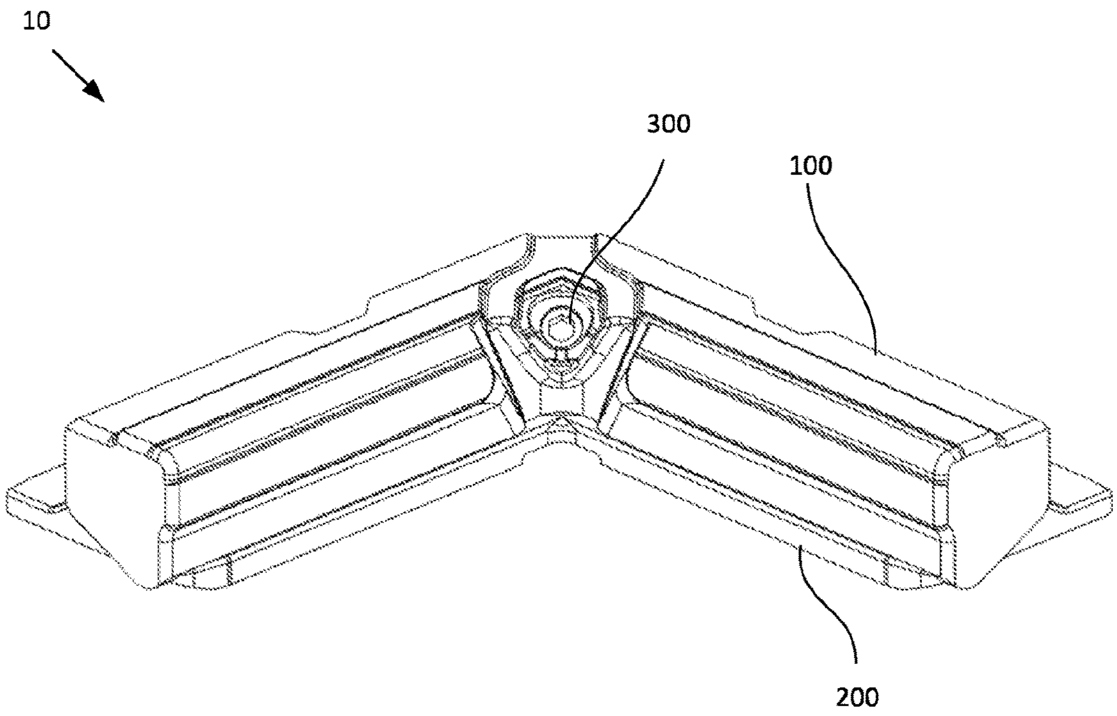
FIGS. 1A and 1B illustrate perspective frontal and rearward views of a frame connector.
Figure 1B:
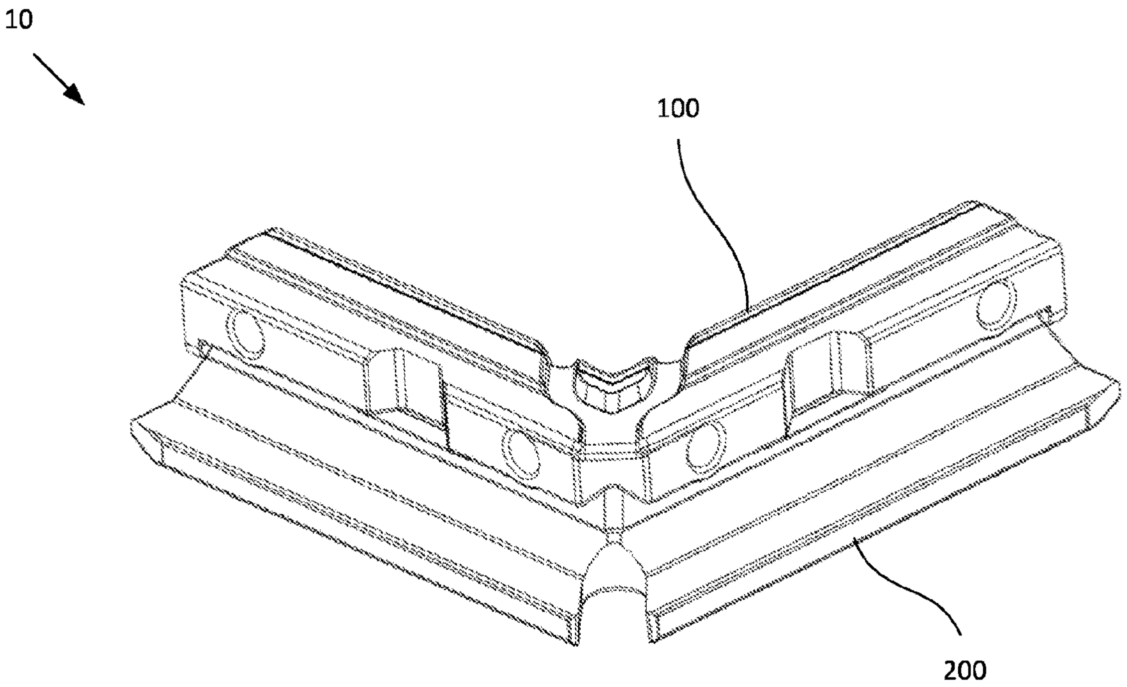

A frame connector 10, such as that illustrated in FIGS. 1A and 1B, enables two frame members to be connected together, in particular, to form a mitre joint. The surface where the first and second frame members join define a mitre joint plane 445 (see FIG. 14B). The frame connector 10 includes a first body 100 connected to a second body 200. An actuator 300 located in a hole within the first body 100 is used to drive the first body 100 relative to the second body 200 and enables the frame connector 10 to be expanded within an internal channel of each of the first and second frame members, securing the frame members to one another.

Figure 2:
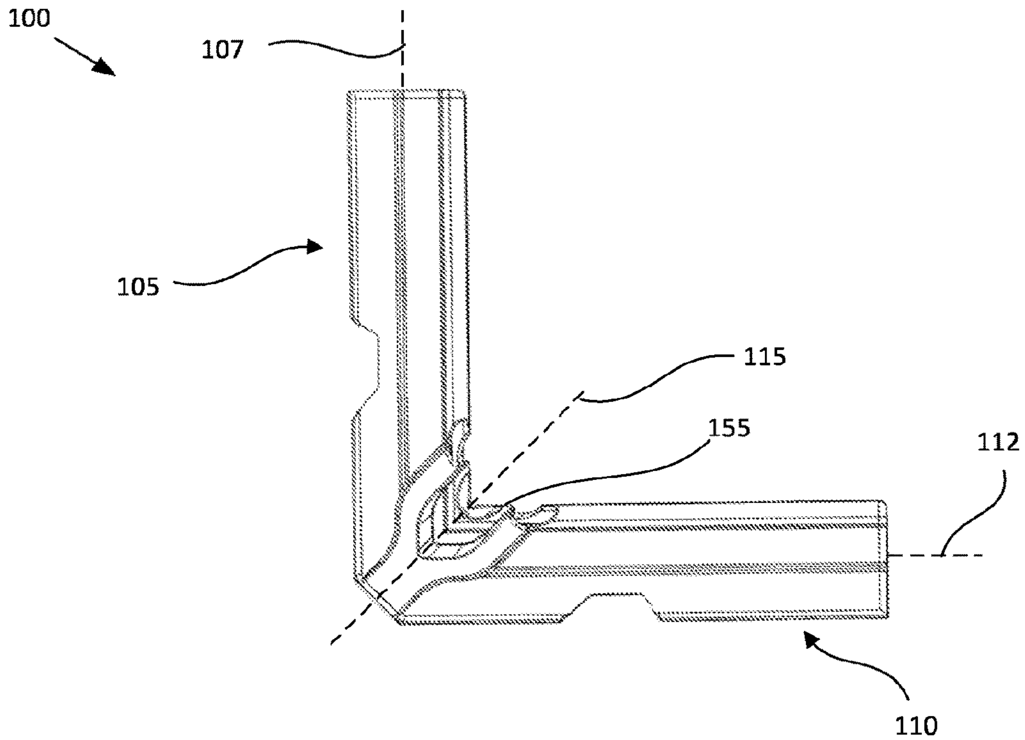
FIGS. 2 and 3 illustrate a lateral and perspective underside view of a first body portion of the frame connector respectively.
Figure 5:
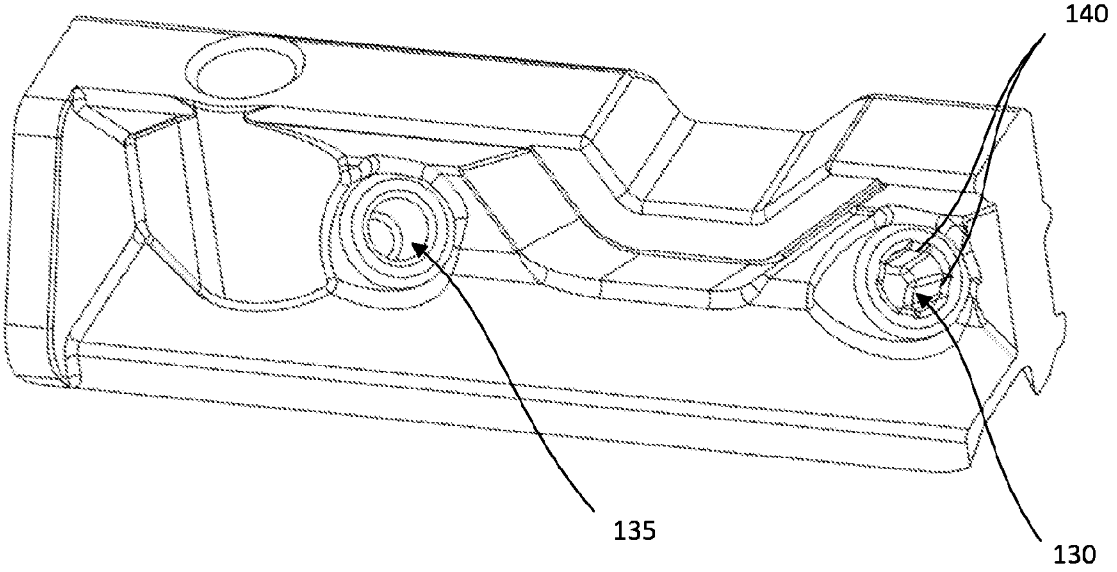
FIG. 5 illustrates a perspective view of a first arm of the first body portion.
Figure 6:
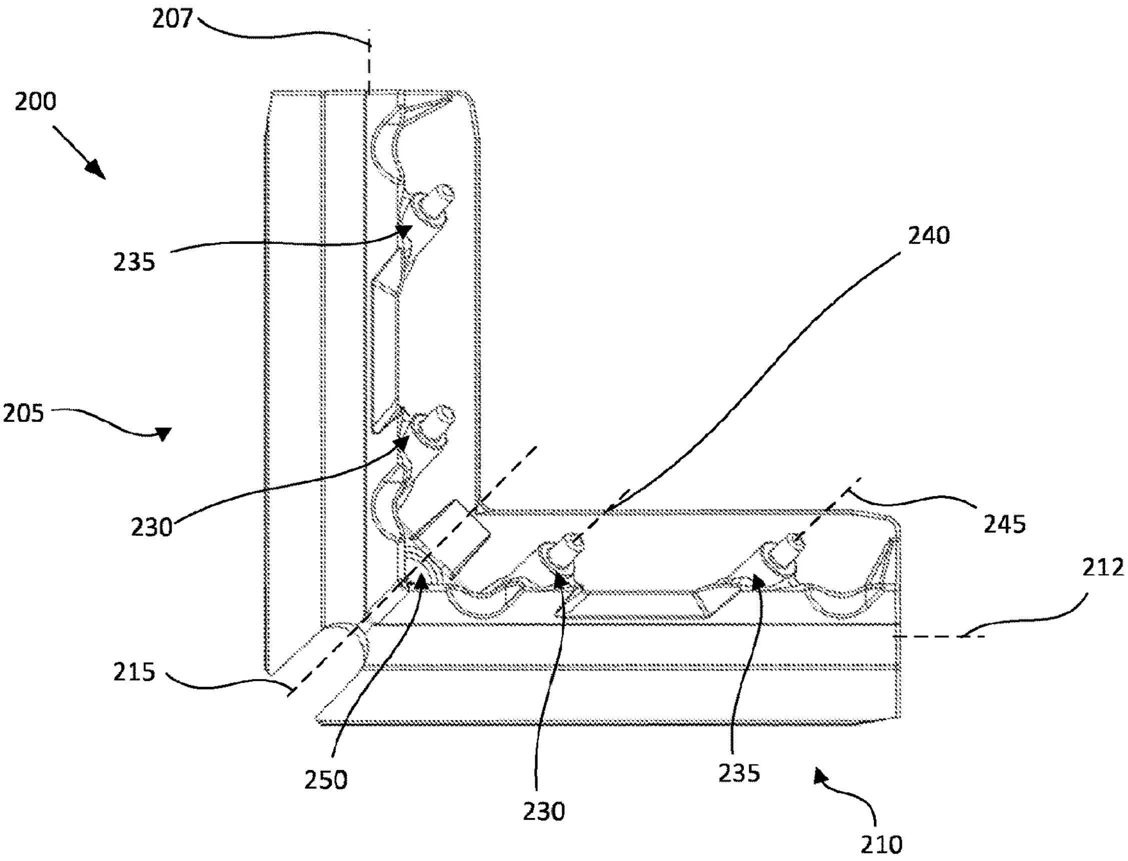
FIGS. 6 and 7 illustrate a lateral views of a second body portion of the frame connector.
Figure 7:
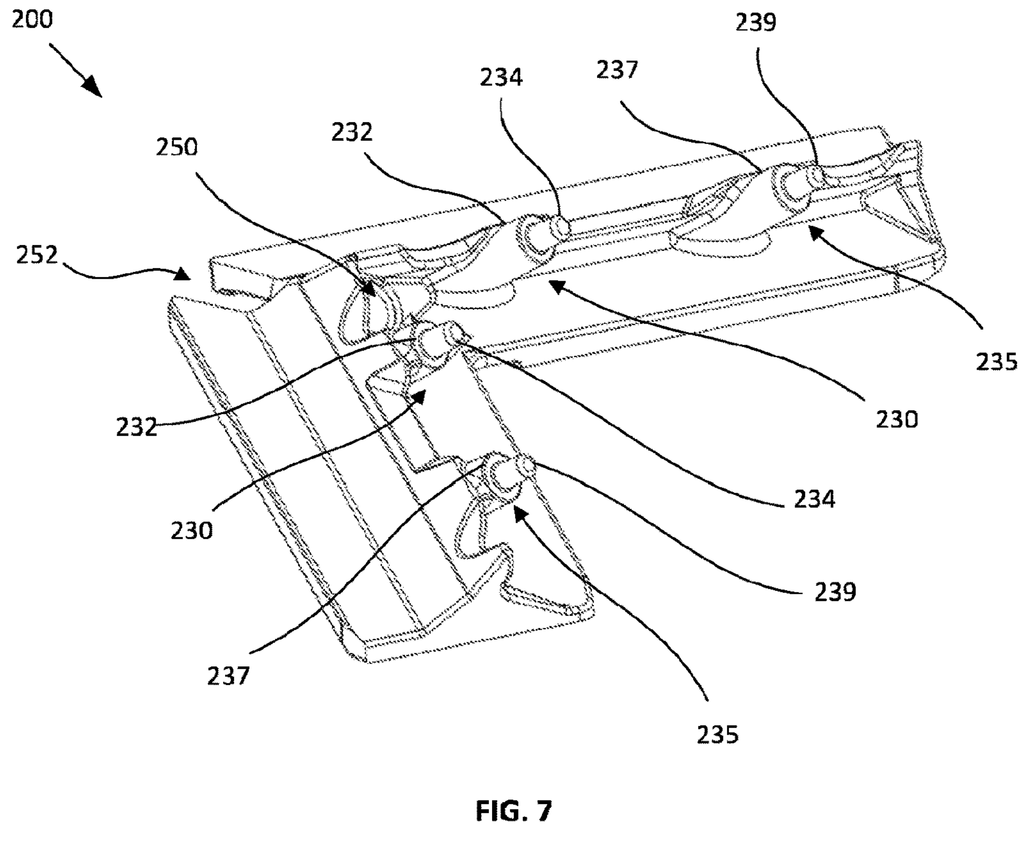

The first body 100 is best illustrated in FIGS. 2 to 5. The first body 100 includes a first pair of arms formed of a first arm 105 extending from an origin 115 to a free end along a first axis 107 and a second arm 110 extending from the origin 115 to a free end along a second axis 112. The first pair of arms define a first plane. While the first pair of arms are shown perpendicular to one another, it would be apparent that this need not be the case, and that the first and second pair of arms may extend in any non-colinear direction. The origin 115 illustrated in FIG. 2 is a plane that is perpendicular to a plane defined by the first pair of arms and crosses the intersection between the first 105 and second 110 arms. The origin 115 is preferably co-planar to the mitre plane 445. The second body 200 is best illustrated in FIGS. 6 and 7. The second body 200 includes a second pair of arms formed of a first arm 205 extending an origin 215 along a first axis 207 and a second arm 210 extending from the origin 215 along a second axis 212 to a free end. The second pair of arms have an upper surface that defines a second plane. While the second pair of arms are shown perpendicular to one another, it would be apparent that this isn't essential and that the second pair of arms may extend in any non-colinear direction. The origin 215 illustrated in FIG. 6 is a plane that is perpendicular to a plane defined by the second pair of arms and crosses the intersection between the first 205 and second 210 arms. The origin 215 illustrated in FIG. 6 is preferably co-planar with the mitre plane. The second and first planes defined by the first and second pairs of arms are preferably parallel to one another. While subsequent reference will only be made to the mitre plane 445, it should be understood that this is for reasons of clarity and that reference to the first 115 and second 215 origin planes would be equally applicable.

To guide the relative movement between the first 100 and second 200 bodies, the frame connector 10 includes an arrangement of pins and corresponding tubular elements. The arrangement of pins and tubular elements directs the motion the first body 100 relative to the second body 200 along an axis. This helps prevent rotation of the first body 100 relative to the second body 200 and ensures uniform and consistent expansion of the frame connector 10 within the frame member. While a particular arrangement is presently described, it would be apparent that this is an exemplary embodiment, and that other arrangements would be equally suited for the present invention. The arrangement of pins and tubular elements is best illustrated in FIGS. 3, 5, 6 and 7.

In one embodiment, the arrangement has tubular elements 130, 135 disposed on the first body 100 and pins 234, 239 disposed on the second body. Specifically, four tubular elements 130, 135 are located within an internal cavity 120 of the first body 100, with two of the tubular elements being located on each of the arms 105,110. The tubular elements 135 are arranged symmetrically about the mitre plane 445 and are disposed towards the distal free ends of each of the first 105 and second 110 arms. The tubular elements 135 project from an inner surface of the first body through the internal cavity 120 at an angle of approximately 45 degrees to the plane formed by the first pair of arms. The tubular elements 135 are formed as a hollow tube and are arranged to engage with a corresponding pin arrangement on the second body 200.

A first subset of the pin arrangement includes two bosses 237 extending from the second body 200 in a first direction by a first distance, with each boss 237 having a respective guide pin 239 extending therefrom in a second direction 245 by a second distance. The pin arrangement complements the tubular elements to facilitate engagement of the guide pin 239 with the respective tubular element 135. By constraining the guide pin 239 to remain within the tubular element 135, the displacement of the first body 100 relative to the second body 200 is substantially constrained to the second direction 245. As shown, the guide pins 239 and tubular elements 135 extend in the same direction. However, it is not essential for the bosses 237 to extend in the same direction 245 as the guide pins 239. Further, while an angle of 45 degrees relative to the first and second plane is preferable, it would be apparent this was not essential. An angle of between 1 and 89 degrees would be equally suitable in the present invention. While the illustrated arrangement of pins and tubular elements to guide the first 100 and second 200 bodies includes two tubular elements 135 and two corresponding guide pins 239, it would be apparent that an arrangement including only one or including more than two tubular elements 135 and two corresponding guide pins 239 would be equally suitable.

To secure the relative positions of the first 100 and second 200 bodies, some of the tubular elements 130 in the arrangement have a reduced inner diameter. This allows a second subset of the arrangement to grip their respective pins 234, subsequently referred to as interference pins, and prevent displacement of the first body 100 relative to the second body 200. The interference pins 234 provide a way of securing the first body 100 to the second body 200 in storage and during insertion. Once the actuator 300 begins to drive the first body 100 relative to the second body 200, the interference pins 234 release, allowing relative displacement between the first 100 and second 200 bodies. While a particular arrangement for gripping the interference pins 234 is described, it would be apparent that this is an exemplary embodiment, and that other arrangements would be equally suited for the present invention.

The second subset of the arrangement are arranged symmetrically about the mitre plane 445 and are disposed towards the mitre plane 445. The tubular elements 130 project from an inner surface of the first body through the internal cavity 120 at an angle of approximately 45 degrees to the plane formed by the first pair of arms. Each of the tubular elements 130 is formed as a hollow tube and is arranged to engage with a corresponding interference pin 234 extending from the second body 200. The interference pins 234 extend from respective bosses 232 formed on the second body 200. The interference pins 234 extend in a first direction by a first amount. To achieve the gripping necessary to hold the relative positions between the first 100 and second 200 bodies, the core of the tubular elements 130 are preferably under-sized compared to the interference pin 234. As best illustrated in FIG. 5, this can be achieved by including a plurality of nubs 140 within the core of the tubular element 130. While a plurality of nubs 140 is preferable, it would be apparent that one nub 140 would be equally suitable. While the nub(s) 140 preferably protrude from the inner surface uniformly, it would be apparent that this is not essential and the nub 140 may be profiled to facilitate gripping of the interference pins 234. One or more of the nubs 140 may have a tapered profile. The interference pins 234 provide a way of securing the first body 100 relative to the second body 200 prior to application of force by the actuator 300. The direction in which the interference pins 234 extend is preferably parallel to that of the guide pins 239. As shown in FIGS. 6 and 7, the interference pins 234 and tubular elements 130 extend in the same direction 240. However, it is not essential for the bosses 232 to extend in the same direction as the rods 239. While the illustrated arrangement for gripping the interference pins 234 includes two tubular elements 130 and two corresponding interference pins 234, it would be apparent that an arrangement including only one or including more than two tubular elements 130 and two corresponding interference pins 234 would be equally suitable. The interference pins are also located proximal to the guide pins 239. While this is preferable, it would be apparent this was not essential and that there may be situations where it is desirable to have the gripping arrangement distal to the guide arrangement. Similarly, while the tubular elements 130, 135 have been illustrated on the first body 100, and the pins arrangement 234, 239 have been illustrated on the second body 200, it would be apparent this is not essential and that the tubular elements 130, 135 and pins 234, 239 may be located on any of the first 100 or second 200 bodies. Preferably the interference pins are located adjacent to, or quasi—in line with, the mitre joint plane 445, as this substantially reduces the risk of rotation between the first 100 and second 200 bodies during expansion of the frame connector 10.

Figure 3:
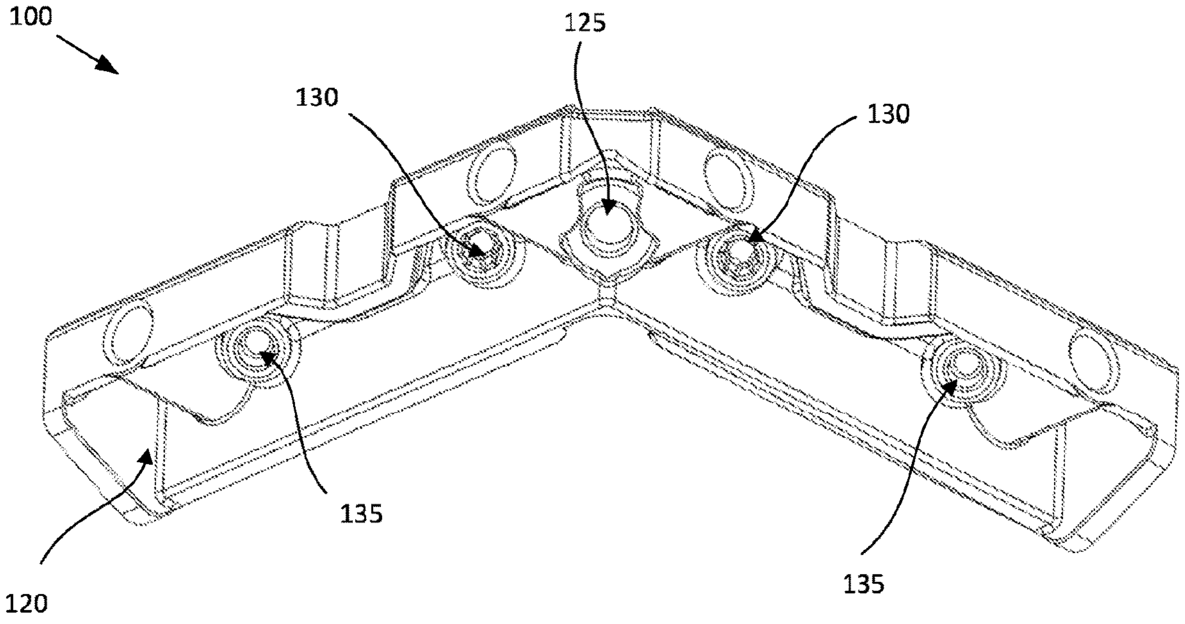
Figure 4:
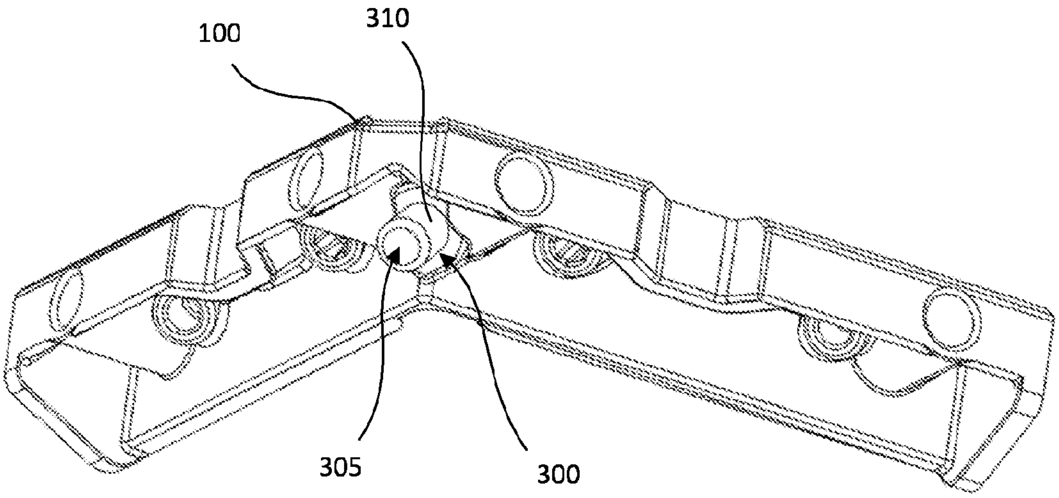
FIG. 4 illustrates a perspective underside view of a grub screw secured within the first body portion.
Figure 8A:
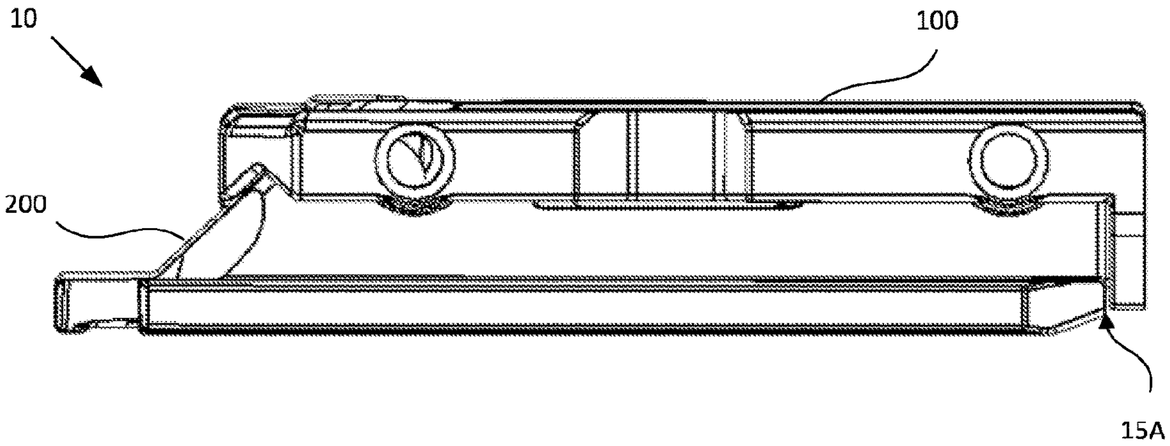
FIGS. 8A and 8B illustrate an underside view of the relative motion between the first and second body portions.
Figure 8B:
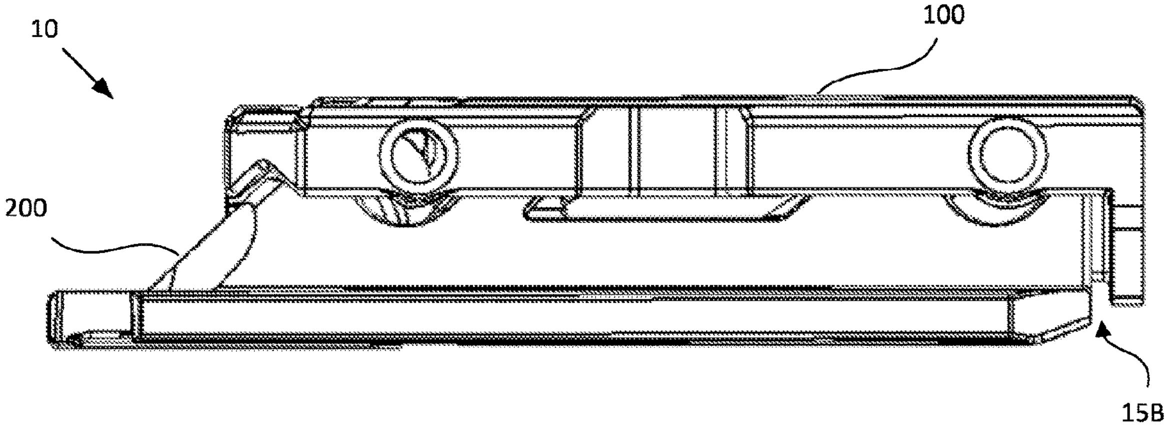

FIGS. 6 and 7 illustrate a contact surface 250 of the second body 200 that engages with the actuator 300. As shown in FIG. 3, a hole 125 in the first body 100 receives the actuator 300. The actuator 300 has a threaded outer surface 310 that corresponds to a threaded inner surface of the hole 125. This allows the actuator 300 to be driven using rotary motion. Rotation of the actuator 300 results in a translation of the first body 100 relative to the second body 200. As the actuator 300 rotates within the hole 125, a base surface 305 of the actuator 300 is brought into contact with the contact surface 250 of the second body 200. As the actuator 300 continues to rotate, the actuator 300 applies a force onto the contact surface 250 and drives the second body 200 away from the first body 100. As shown in FIGS. 8A and 8B, when the frame connector 10 is expanded, the spacing between the first 100 and second 200 bodies may increase from a first spacing 15A to a second spacing 15B. The actuator 300 may be a mechanical fastener, such as a grub screw, or bolt. Screws are preferable, as they self-lock once rotation of the actuator ceases. This reduces the risk of the frame connector 10 contracting before the frame connector can be permanently fixed in place. While the actuator 300 is shown secured to the first body 100 by a threaded hole 125, it would be apparent that the actuator 300 could be secured by other means and that the threaded outer surface 310 could interact with a threaded hole in the second body 200. The threaded hole in the second body 200 may be in place of the contact surface 250.

Figure 9:
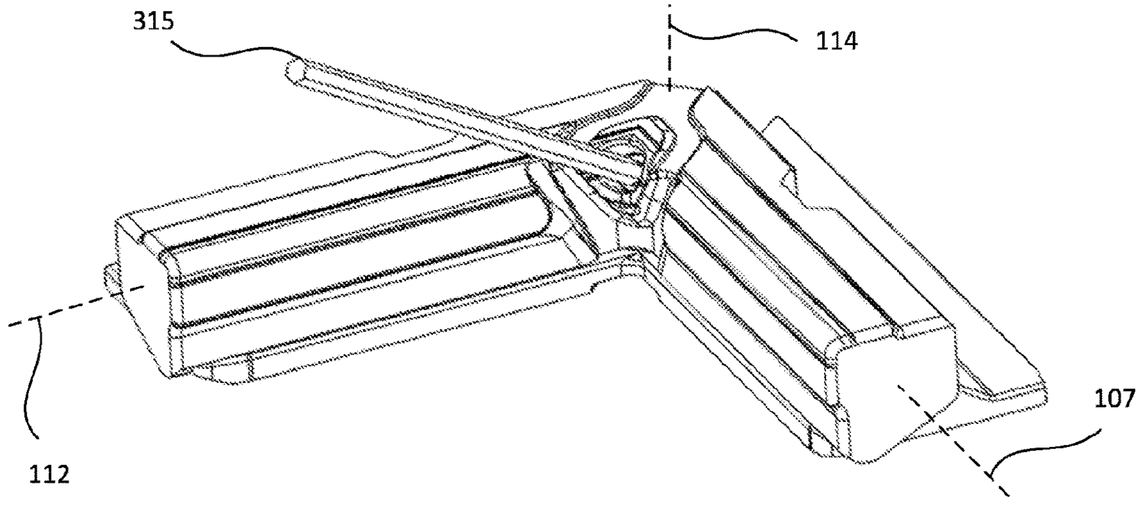
FIG. 9 illustrates a perspective frontal view of a tool operating the actuator.

FIG. 9 illustrates a tool 315 that can be used to provide rotary motion to the actuator 300. The hole 125 has a cross-section that intersects the mitre plane 445 and has a longitudinal axis that forms an acute angle relative to the first plane. The longitudinal axis forms an angle of approximately 45 degrees to the first plane. This results in the actuator 300 applying a force on the contact surface 250 at substantially the same angle. While an angle of 45 degrees is preferable, it would be apparent that this was not essential. In one embodiment, the longitudinal axis is angled relative to the first plane and an axis 114 perpendicular to the first plane. In this case, the longitudinal axis of the hole 125 forms an acute angle to each of the axes 107, 112, 114 of the first pair of arms, but also relative to the first plane and the corresponding planes defined by axes 112 and 114 and 107 and 114. The longitudinal axis preferably forms an angle of 45 degrees to each of these planes. This results in the expansion of the frame connector 10 in at least two of the planes. While application of the force at the mitre plane 445 provides one way of driving the first body 100 relative to the second body 200 in at least two planes, it would be apparent that such a motion may be achieved by using two or more screws to drive the second body 200 relative to the first body 100 in two or more planes. In one embodiment, a second screw configured to expand the frame connector 10 in a second direction perpendicular to the first direction allows the frame connector 10 to expand in at least two perpendicular directions. While the second screw is preferably perpendicular to the first screw, it would be apparent that this was not essential. Having an acute angle between the first and second screws would still achieve displacement of the first body 100 relative to the second body 200 in both planes. The second screw is preferably secured within a second threaded hole (not shown) in the first body 100 and is arranged to contact the contact surface 250. The contact surface 250 may be one continuous surface or may be a series of spaced or separated locations on the second body 200.

The tool 315 used to operate the actuator 300 may be operable by a user. As access to the actuator 300 may be restricted due to the structure of the frame member 400 (see FIG. 10), the tool 315 is preferably capable of providing rotary motion from a number of angles. The tool 315 preferably comprises a universal joint. The tool 315 is preferably an Allen key with a ball end, as the ball end acts as the universal joint and the non-circular cross-section allows the Allen key to engage with the actuator 300 which incorporates corresponding recesses to receive the Allen key. While an Allen key is shown, it would be apparent that other tools would be equally suitable. While the universal joint illustrated in FIG. 9 is formed as part of the tool 315, it would be apparent that in other embodiments, the universal joint may be formed as part of the actuator 300.

Figure 10:
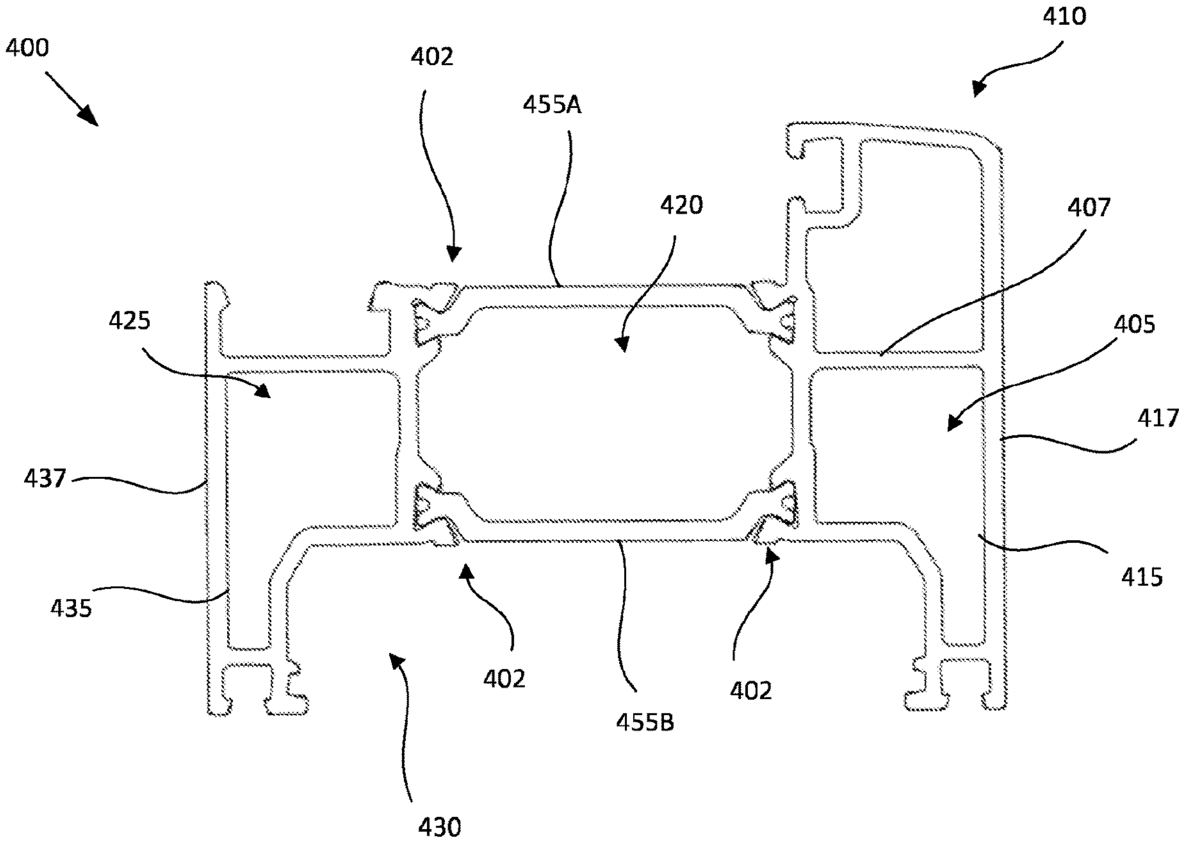
FIG. 10 illustrates a cross-sectional view of a frame member.

FIG. 10 illustrates a cross-sectional view of a frame member 400 that may be used to form a frame including a mitre joint. The frame member 400 includes a first component 410 having an outer surface 417, an inner surface 415 and a rib 407 extending across the cross-section of the first component 410. The inner surface 415 defines a first chamber 405 within the first component 410. The frame member 400 also includes a second component 430 having a second inner surface 435 that defines a second chamber 425. The first 410 and second 430 components are spaced apart from one another by a thermal break 420. The thermal break 420 is defined by insulating members 455 disposed between the first 410 and second 430 components. Rolled connections 402 are used to secure the first 410 and second 430 components to the insulating members 455.

Figure 12:
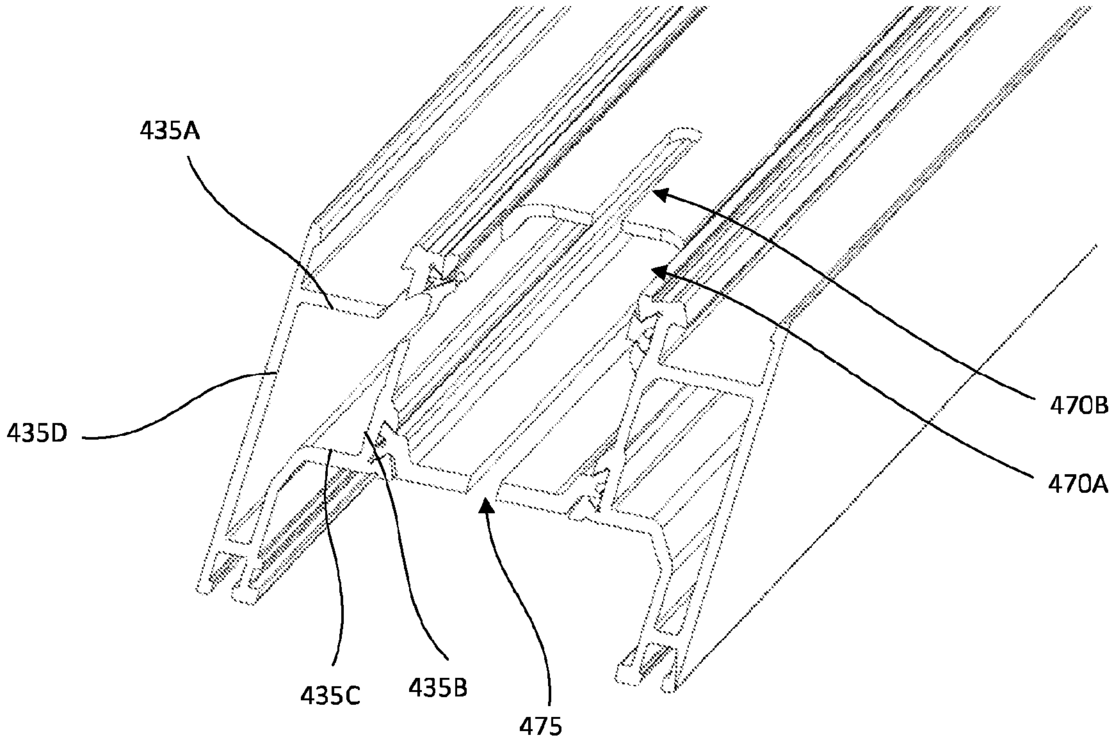
Figure 13:
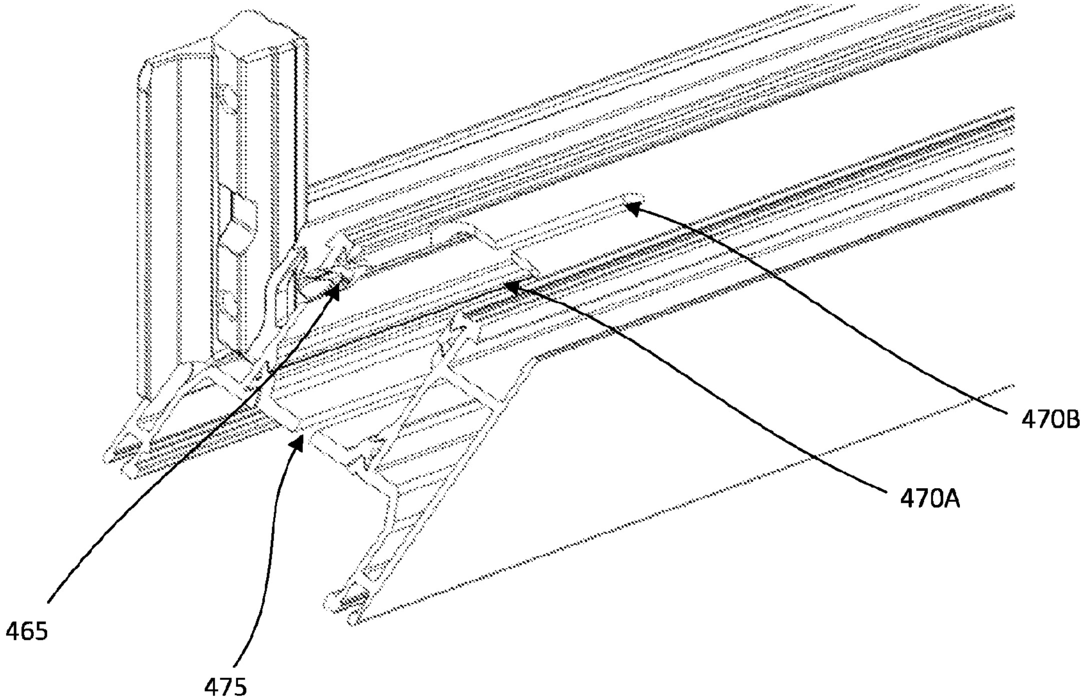
FIG. 13 illustrates a perspective lateral view of the frame connector in the mitre joint.

As shown in FIGS. 12 and 13, a first insulating member 455A has slots 470 and 475 extending away from the mitre joint plane 445. Slot 470 has a first section 470A adjacent to the mitre joint plane 445 and a second section 470B adjacent to the first section 470A. The first section 470A has a first width and allows access to the actuator 300. The second section 470B has a second width and, in combination with slot 475 formed within the second insulating member 455B, allows for relative motion between the first 410 and second 430 components of the frame member 400. The relative motion between the first 410 and second 430 components allows for any errors in the total width of the frame member 400 during fabrication to be corrected for. This can be achieved by displacement of the first body 100 relative to the second body 200 in a direction perpendicular to the plane defined by the first pair of arms.

The frame member 400 has a slot 465 formed in the second 430 component and, in combination with the first section 470A formed in the insulating member 455, facilitates access to the actuator 300 (see FIG. 13). Slots 465 and 470A are located over the actuator 300 and by having a tool 315 incorporating a universal joint, only one end 440 of the frame members that make up the mitre joint plane 445 need to be machined. This allows for a more efficient manufacturing process, as ends of the frame that do not requiring machine will require fewer steps to produce. While one specific arrangement of slots is shown in FIG. 13, it would be apparent that other components of the frame member 400 may incorporate one or more slots to facilitate access to the actuator 300, depending on the requirements of the frame. For example, the slot may be formed in the rib 407 of the first 410 or second 430 components. The arrangement of slots in the frame member 400 and an opening 155 on the first body 100 (see FIGS. 2 and 13) allows the tool 315 to be inserted into the connected frame to operate the actuator 300. The opening 155 is configured to direct the tool 315 toward the actuator 300, for example, by having a profile that is wider at an outer surface of the first body 100 compared to the diameter of the hole 125. This enables the tool to be inserted into the mitre joint from a wide range of angles. Furthermore, by accessing the actuator 300 from an internal aspect of the frame member 400, a more aesthetic finish is achieved, as no additional holes need to be formed in the outer wall 417 of the frame member 400 for access from an external aspect. Due to the modular nature of the frame member 400, sections of frame member 400 incorporating the slot may be manufactured in advance and secured to the insulating members 455 as required. The hole 125 is also preferably offset from the mitre plane 445 to avoid the need for both frame members 400 to include a component incorporating the slot.

Figure 11:
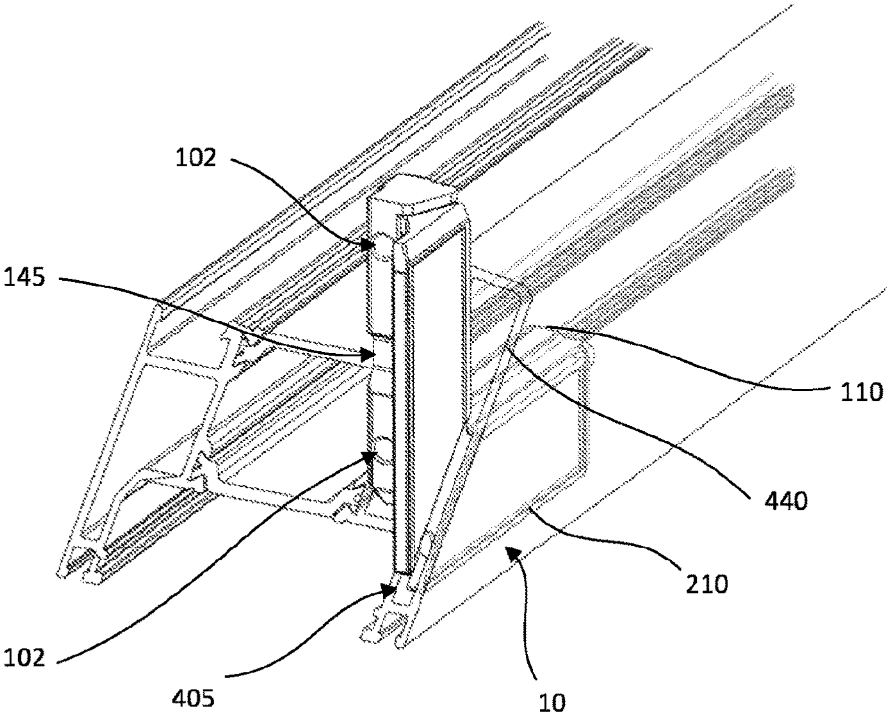
FIGS. 11 and 12 illustrate a perspective lateral view and a cross-sectional view of the frame connector secured within the frame member.

The end 440 of the frame member 400 is cut at 45 degrees (see FIG. 11). The first component 405 of the frame members 400 has been made transparent in FIG. 11 for clarity. As only the end of the frame member having the slots 470, 475 requires machining, the other end 440 may be cut with a saw, which is both time- and cost-effective. Once the end 440 is cut, the frame connector 10 is inserted into the frame member 400 and secured within the frame member 400. Specifically, by inserting the second arms 110, 210 of the respective first and second pairs of arms into the first chamber 405, a user operates the actuator 300 to expand the frame connector 10 and secure the frame connector 10 within the frame member 400. Due to the acute angle of the hole 125, the second body 200 is driven apart in three directions 107, 112, 114 with respect to the first component 405. In one embodiment, the frame connector 10 presses against a first pair of opposed surfaces 435A, 435C and a second pair of opposed surfaces 435B, 435D. The first body 100 presses against inner surfaces 435A and 435B and the second body 200 presses against inner surfaces 435C and 435D (see FIGS. 12 and 13). Once the interference pins 234 are released, the tapered profile of the interference pins 234 allows for some movement perpendicular to the first direction. The internal profile of the chamber in which the frame connector 10 is inserted determines the final relative positions of the first 100 and second 200 bodies. For example, if the there is a larger space between the frame connector 10 and one face of the chamber compared to a face perpendicular to it, the frame connector 10 will expand until contact is made with the closest face. At this point, the first 100 and second 200 bodies will translate relative to each other until the frame connector 10 fills the internal profile of the chamber.

Figure 14A:
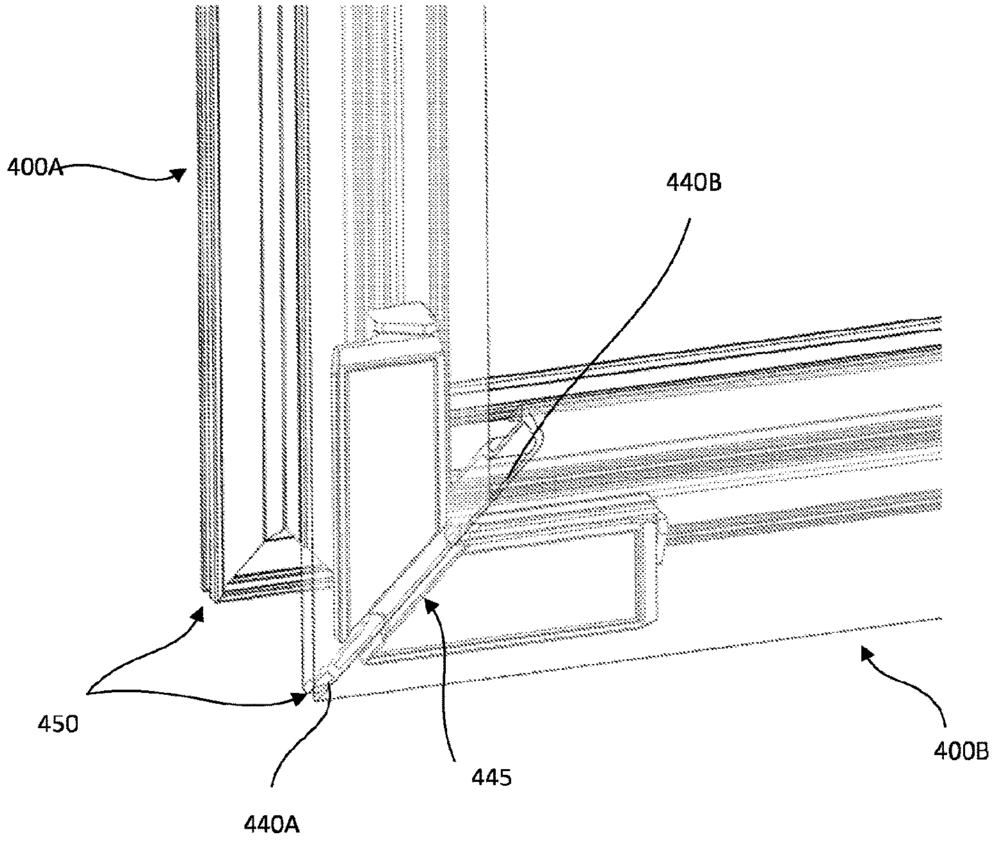
FIGS. 14A and 14B illustrate perspective lateral and underside views of a mitre joint.
Figure 14B:
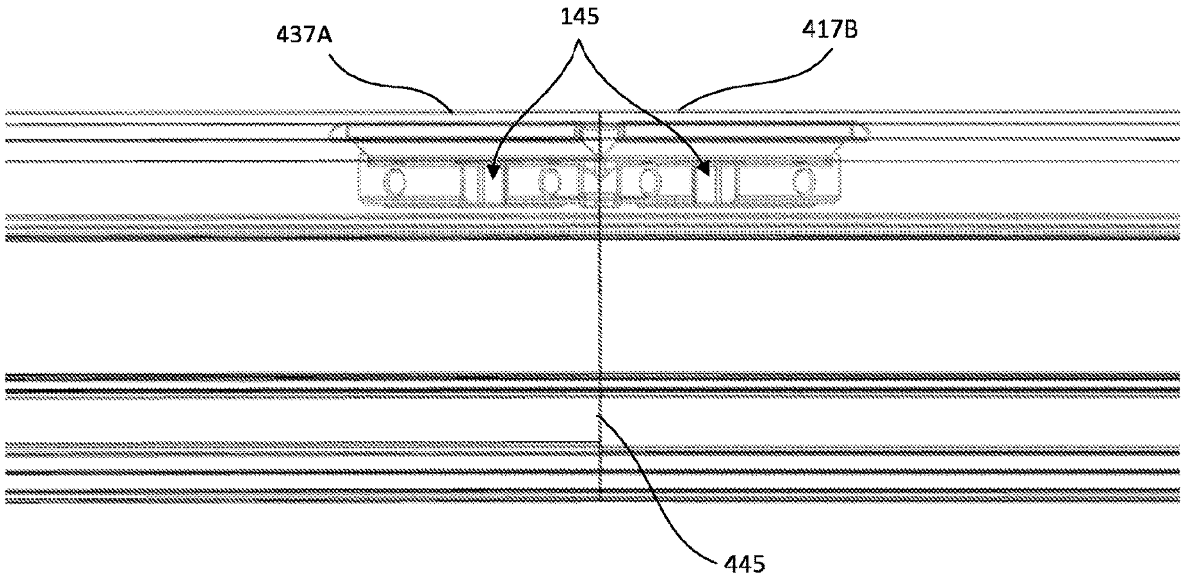

FIGS. 14A and 14B illustrate perspective lateral and underside views of the mitre joint. One of the components of the frame members 400 is shown transparent for clarity. When securing the first frame member 400A to the second frame member 400B, it is important to align the first 440A and second 440B ends. Misalignment between the ends results in one or more steps forming at the mitre plane 445 which is undesirable. The frame connector 10 of the present invention substantially reduces the risk of steps forming by expanding the frame connector 10 equally in both frame members 400 using the actuator 300. By using one actuator 300 to drive expansion in three directions, the respective outer surfaces 417B, 437A of the first 400A and second 400B frame members form a substantially continuous surface across the mitre plane 445 (see FIG. 14B). Similarly, the risk of steps forming at the corners 450 at the mitre plane 445 are substantially reduced (see FIG. 14A). This provides a flush apex between the first 400A and second 400B frame members. An installer may start assembling the frame by inserting the first arms 105, 205 of the respective first and second pairs of arms into a first chamber of the second frame member 400B and inserting the second arms 110, 210 of the respective first and second pairs of arms into the first chamber 405 of the first frame member 400A (see FIG. 11)

and. The installer can then bring the first 440A and second 440B ends together so the respective faces abut, before inserting a tool 315 into the slot 470B, operating the actuator 300 and expanding the frame connector 10 to secure the first frame member 400A relative to the second frame member 400B. This allows a flush mitre joint to be formed in a single operation of the actuator 300.

Expansion of the frame connector 10 causes the first 100 and second 200 bodies to contact an inner surface of each of the frame members and the friction generated by this expansion secures the frame connector in place. Permanent methods of fixation include, but are not limited to, any of pinning, screwing, gluing and crimping. To facilitate crimping, the first body 100 includes a notch configured as a crimp seat 145 on each of the first 105 and second 110 arms of the first pair of arms. This allows an external machine to deform the outer wall of the frame member 400 into the crimp seat 145 to permanently secure the mitre joint. The first 100 and second 200 bodies may have features to enable glue to more easily flow around, across and through the frame connector 10. Such features may be on an internal or an external surface of the first 100 and/or second 200 bodies. The features may include any of grooves, channels, slots, recesses or holes. One example of such a feature is slot 252 on the second body 200 to facilitate the flow of glue when injected through the mitre joint 445 for permanent fixation (see FIG. 7).

Alternatively, the frame may be assembled using frame members that have not been machined to incorporate a slot for a tool 315. In this case, an installer may start as described above. However, instead of bringing the first 440A and second 440B ends into contact, the installer leaves a space between the abutting faces of the first 400A and second 400B frame members so that the tool 315 can be inserted between the abutting faces. This provides a way for the installer to access and operate the actuator 300 to expand the frame connector 10 so as to secure the first frame member 400A relative to the second frame member 400B. This will secure the frame members 400A, 400B with a gap between the abutting faces. The installer is then able to remove the tool before closing the gap to form the mitre joint. This may be achieved by applying a force to either of the first 400A or second 400B frame members, for example by tapping with a mallet, to push the abutting faces together.

The first body 100 also includes two mounting holes 102 on the first 105 and second 110 arms of the first body 100 (FIG. 11). The mounting holes 102 are typically for securing the frame member 400 to a hinge or similar fastening. By way of example, once the frame members 400 have been secured together to form a panel, such as a door or window, the mounting holes 102 may be used to mount the panel to a frame.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers and characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A frame connector for securing a first frame member to a second frame member, the frame connector comprising:

a first body having a first pair of arms extending along first and second axes from a mitre plane to respective free ends;

a second body adjacent to the first body and having a contact surface and a second pair of arms extending from the mitre plane to respective free ends, and an actuator secured to the first body and arranged to apply a force to the contact surface in a first direction, wherein the first and second axes are non-colinear and define a first plane, wherein the first direction forms an acute angle to the first plane, wherein the actuator is arranged to displace the first body relative to the second body in the first direction.

2. A frame connector according to claim 1, wherein the first direction forms an acute angle to a plane defined by the normal axis of the first plane and the first axis.

3. A frame connector according to claim 1, wherein the actuator is configured to apply the force to the second body following input from a tool.

4. A frame connector according to claim 3, wherein the actuator comprises a threaded outer surface, wherein the first body comprises a hole having a threaded inner surface corresponding to the threaded outer surface to secure a portion of the actuator within the first body, and wherein the actuator is arranged to separate the first body from the second body upon rotation of the tool.

5. A frame connector according to claim 4, wherein the hole extends through the first body at an angle with the first plane of between 1 and 89 degrees.

6. A frame connector according to claim 1, wherein the contact surface intersects the mitre plane.

7. A frame connector according to claim 1, wherein the contact surface is substantially perpendicular to the first direction.

8. A frame connector according to claim 1, comprising a first plurality of members extending from the first body along a series of parallel axes, and a second plurality of members extending from the second body towards the first body, wherein each of the first plurality of members comprises a core extending along the series of parallel axes configured to receive a respective member of the second plurality of members, wherein, in use, the first and second plurality of members are configured to constrain the displacement of the second plurality of members along the series of parallel axes.

9. A frame connector according to claim 8, wherein the series of parallel axes is substantially parallel to the first direction.

10. A frame connector according to claim 8, wherein the first and second pluralities of members are arranged symmetrically about the mitre plane.

11. A frame connector according to claim 8, wherein a first subset of the first plurality of members is configured to generate an interference fit with a first subset of the second plurality of members to maintain a first distance between the first and second bodies.

12. A frame connector according to claim 11, wherein the first subset of the first plurality of members is configured to release the second subset of the first plurality of members upon application of the force.

13. A frame connector according to claim 11, wherein the first subset of the second plurality of members are adjacent to the mitre plane.

14. A system comprising:

a frame connector according to claim 1;

a first frame member having a first frame member first face and a first frame member first channel configured to receive the first arms of the respective first and second pairs of arms of the frame connector, and a second frame member having a second frame member first face and a second frame member first channel configured to receive the second arms of the respective first and second pairs of arms of the frame connector, wherein the frame connector is configured to secure the first frame member relative to the second frame member such that first frame member first face and the second frame member first face abut to form a mitre joint.

15. A system according to claim 14, wherein the second frame member comprises a second frame member second channel, and first and second insulating members disposed between the second frame member first channel and the second frame member second channel, wherein the first and second insulating members comprise a first aperture at the second frame member first face, and wherein the first aperture is arranged to allow relative displacement between the first and second channels.

16. A method of assembly, comprising:

providing a frame connector according to claim 1, inserting the first pair of arms of the frame connector into a first channel of a first frame member, the first frame member having a first face intersecting the first channel of the first frame member, inserting the second pair of arms of the frame connector into a first channel of a second frame member, the second frame member having a second face intersecting the first channel of the second frame member, arranging the first and second frame members such that the first face is spaced from the second face, operating the actuator to secure the first frame member relative to the second frame member, and applying an external force to one of the first or second frame members so as to abut the first face against the second face, thereby forming a mitre joint.

* * * * *